(12) United States Patent
Karkheck et al.

(10) Patent No.: US 12,539,568 B1
(45) Date of Patent: Feb. 3, 2026

(54) SYSTEMS AND METHODS FOR INSTALLING PUSH-IN FASTENERS

(71) Applicant: Terabase Energy, Inc., Berkeley, CA (US)

(72) Inventors: Johann Fritz Karkheck, Petaluma, CA (US); Dylan Richart Harper, Vancouver, WA (US)

(73) Assignee: Terabase Energy, Inc., Berkeley, CA (US)

( * ) Notice: Subject to any disclaimer, the term of this patent is extended or adjusted under 35 U.S.C. 154(b) by 0 days.

(21) Appl. No.: 18/791,395

(22) Filed: Jul. 31, 2024

(51) Int. Cl.
| | |
|---|---|
| *B23P 19/04* | (2006.01) |
| *B23P 19/027* | (2006.01) |
| *H02S 20/20* | (2014.01) |
| *H02S 30/10* | (2014.01) |

(52) U.S. Cl.
CPC ............. *B23P 19/04* (2013.01); *B23P 19/027* (2013.01); *H02S 20/20* (2014.12); *H02S 30/10* (2014.12); *Y10T 29/49355* (2015.01)

(58) Field of Classification Search
CPC ......... Y10T 29/49959; Y10T 29/49355; H02S 20/10; H02S 20/20; H02S 20/30–32; H02S 30/00; H02S 30/10; B23P 19/006; B23P 19/02; B23P 19/027; B23P 19/04; B23P 19/10; B23P 19/12; B21J 15/12; B21J 15/14; B21J 15/30–32
See application file for complete search history.

(56) References Cited

U.S. PATENT DOCUMENTS

| | | | | |
|---|---|---|---|---|
| 2017/0368648 | A1* | 12/2017 | Marrocco | B25J 9/1682 |
| 2023/0327603 | A1* | 10/2023 | Taha | H02S 30/00 |
| | | | | 136/244 |
| 2024/0372501 | A1* | 11/2024 | Jensen | H02S 40/00 |

FOREIGN PATENT DOCUMENTS

| | | | |
|---|---|---|---|
| CN | 116214122 A | * | 6/2023 |
| KR | 102395905 B1 | * | 5/2022 |

OTHER PUBLICATIONS

International Search Report and Written Opinion of the International Searching Authority mailed Sep. 18, 2025 in related PCT application No. PCT/US2025/039789, (7 pgs).

* cited by examiner

*Primary Examiner* — Matthew P Travers
(74) *Attorney, Agent, or Firm* — Michael North

(57) ABSTRACT

During the installation of solar panels, multiple mounting brackets are attached to solar panel frames, typically implemented manually by an installer. Systems and methods for automatic fastener installation are disclosed to facilitate an automatic assembly process for solar tables. The automatic fastener comprises fastener holders, fastener driving blocks, lifters, and actuators to enable an automatic installation process that comprises a fastener loading stage, a fastener positioning stage, a fastener driving stage, and a retracting stage. The actuators may be oriented in opposite directions to offset activation momentum during fastener installation.

20 Claims, 19 Drawing Sheets

SYSTEMS AND METHODS FOR INSTALLING PUSH-IN FASTENERS

TECHNICAL FIELD

The present disclosure relates generally to an automatic fastener installation. More particularly, the present disclosure relates to systems and methods for automatic fastener installation that facilitate an automatic assembly process for solar tables for improved efficiency.

BACKGROUND

The importance of solar power systems is well understood by one of skill in the art. Government agencies and companies are scaling the size and number of solar solutions within their energy infrastructure. This transition from traditional fossil fuel energy systems to solar energy solutions presents several challenges. One challenge is the cost-effective management of the construction process and the ability to improve installation efficiency during the construction process.

A large-scale solar power plant typically includes thousands of solar modules that are located across a multi-acre terrain and that are electrically coupled to provide a source of energy. These large-scale systems are often located in remote areas and require a significant investment in materials, resources, and labor for on-site installation. It can be very challenging to maintain consistent installation processes at each point of installation within a construction site across large areas. These issues further contribute to an increase in the cost and complexity of what is already a very cost-sensitive process.

In a typical on-site solar table assembly process, multiple solar modules are securely aligned and attached to a shaft or torque tube to form a row of solar panels. Such a row of solar modules may be supported by ground piles with the torque tube securely fastened to ground piles at a desired rotational angle such that the solar modules are oriented for maximum energy production efficiency. During installation, an installer needs to attach the module frames of a solar panel to mounting brackets on the torque tube. Both the mounting brackets and the panel frames may have slots such that the mounting brackets may be aligned to a desired mounting position. An installer may use a fastener, e.g., a wedge, through the slots to securely attach a mounting bracket to a panel frame. A typically prior-art installation is implemented manually by an installer, who may need to load a fastener individually for installation. Tools used by workers to install these fasteners include hammers, mallets, slide hammers, pneumatic or electric impact hammers, clamps, powder-actuated drivers, etc.

The manual fastener installation method requires workers to align the fastener and tool before installation. The alignment and installation process can vary widely between workers for reasons such as experience, ergonomics, height, quality of vision, exhaustion, physical strength, etc. Differences between users in the alignment and installation process can lead to increased installation time and poor quality control of installed fasteners. Evaluation of fastener installation quality is typically performed by the worker or supervisor through visual inspection, another process that can vary significantly between evaluators for the same reasons that cause variance in fastener installation.

During installation, workers need to load the fastener into an installation tool or workpiece, one at a time, by hand. Correctly orienting the fastener into the tool or workpiece adds to the total installation time and can vary based on the tool geometry and worker experience. The length of the installation tool and fastener combined with the distance between components to be fastened can prevent the installation of multiple fasteners simultaneously. Therefore, the effectiveness of this manual approach may at most work fine within smaller solar deployments but struggles to cost-effectively scale to large solar systems.

What is needed are systems, devices and methods that improve the efficiency of automatic fastener installation to facilitate the installation of large-scale solar panel systems.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that the description is not intended to limit the scope of the invention to these particular embodiments. Items in the figures may be not to scale.

DETAILED DESCRIPTION OF EMBODIMENTS

Figure 1:
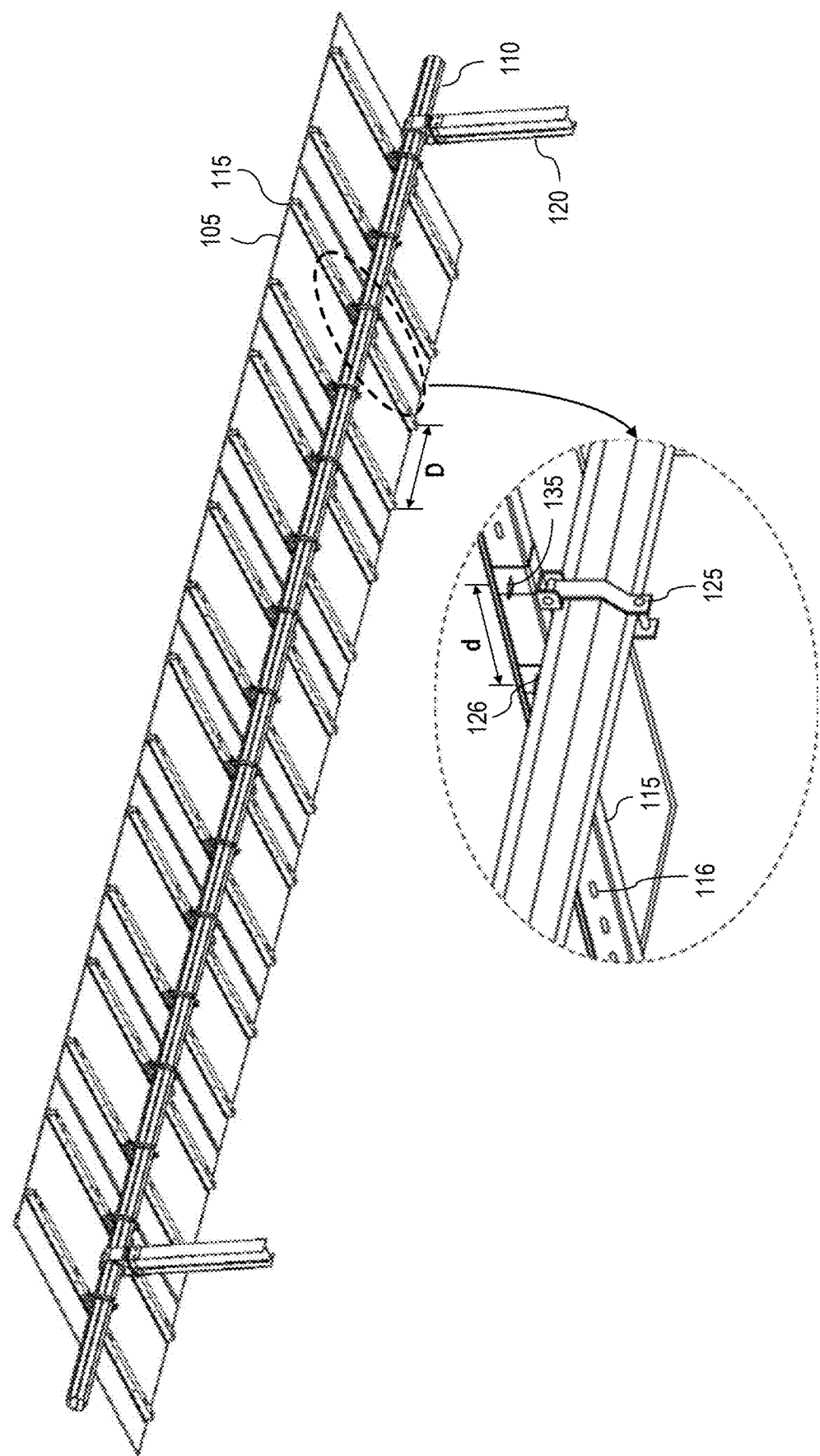
FIG. 1 shows a solar table installed on a construction site.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method.

Components, or features, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in a variety of mechanical structures supporting corresponding functionalities of the automatic fastener installer.

Furthermore, connectivity between components or systems within the figures are not intended to be limited to direct connections. Also, components may be integrated together or be discrete prior to construction of an automatic fastener installer.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A component, function, or structure is not limited to a single component, function, or structure; usage of these terms may refer to a grouping of related components, functions, or structures, which may be integrated and/or discrete.

Further, it shall be noted that: (1) certain components or functionals may be optional; (2) components or functions may not be limited to the specific description set forth herein; (3) certain components or functions may be assembled/combined differently across different fastener installers; and (4) certain functions may be performed concurrently or in sequence.

Furthermore, it shall be noted that many embodiments described herein are given in the context of the assembly and installation of large numbers of solar panels within a system, but one skilled in the art shall recognize that the teachings of the present disclosure may apply to other large and complex construction sites in which resources and personnel are difficult to manage and accurately predict. Additionally, embodiments of an automatic fastener installer may be implemented in smaller construction sites or construction sites for applications other than solar farms.

In this document, "large-scale solar system" or "large solar projects" is defined as a solar system or project involving installation and/or operation of 1000 or more solar modules. The word "resources" is defined as material, parts, components, equipment or any other items used to construct a solar table and/or solar system. The term "solar table" is defined as a structural assembly comprising one or more photovoltaic (PV) or solar modules and/or one or more module frames (or purlins) for module support. Some types of solar tables may have electrical harnesses and supplemental structures that allow them to connect to other solar tables or foundations/piles while other types do not have this supplemental structure. The term "torque tube" is defined as a structural component that supports multiple solar modules with proper alignment. Torque tubes are often part of tracking systems for optimal sunlight capture for solar modules, and typically have a polygonal or circular cross-sectional shape. The term "fastener" is defined as a hard device that mechanically joins or affixes a module frame and a mounting bracket together such that a solar module is securely locked onto a torque tube. The term "transport vehicle" is defined as a specifically designed vehicle to transport solar tables from the centralized solar table assembly factory for on-site installation or on-site storage. The transport vehicle may be driven by personnel, controlled by remote control, or autonomously driven by a computer system.

FIG. 1 shows a solar table installed on a construction site. Multiple solar modules 105 are securely aligned to form a row of solar panels and attached to a shaft or torque tube 110, which are supported by ground piles 120. Each solar module may typically have two module frames 115 with a frame distance D in between. The torque tube is securely fastened to the ground piles and may be fixed at a desired rotational angle or be rotatable during operation such that the solar panels can operate continually under maximum energy production efficiency. To securely attach a solar module to a torque tube, the module frames 115 of the solar module are firmly connected to a mounting bracket 125, which is firmly clamped or coupled to the torque tube 110. The module frame 115 has multiple slots 116, and the mounting bracket 125 typically has a pair of slots 126 that are positioned on both sides of the torque tube with a slot distance d in between. The mounting bracket 125 may be aligned to a desired mounting position and be securely attached to a panel frame 115 using a fastener 135 through the slots of the mounting bracket 125 and the panel frame 115.

Traditionally, the fastener installation process is implemented on-site by an installer. The installer needs to load a fastener individually for installation and then reload another fastener manually for the next installation. This individual fastener-loading approach limits the efficiency of solar panel installation and thus increases the installation cost.

Described hereinafter are embodiments of automatic fastener installer for solar table assembly with improved efficiency. The automatic fastener installation may be implemented as a part of an automatic solar table assembly process performed at a centralized factory to provide an easy and streamlined method for fastener installation. As a result, fastener installation may be implemented automatically and consistently for improved installation efficiency and quality.

Figure 2:
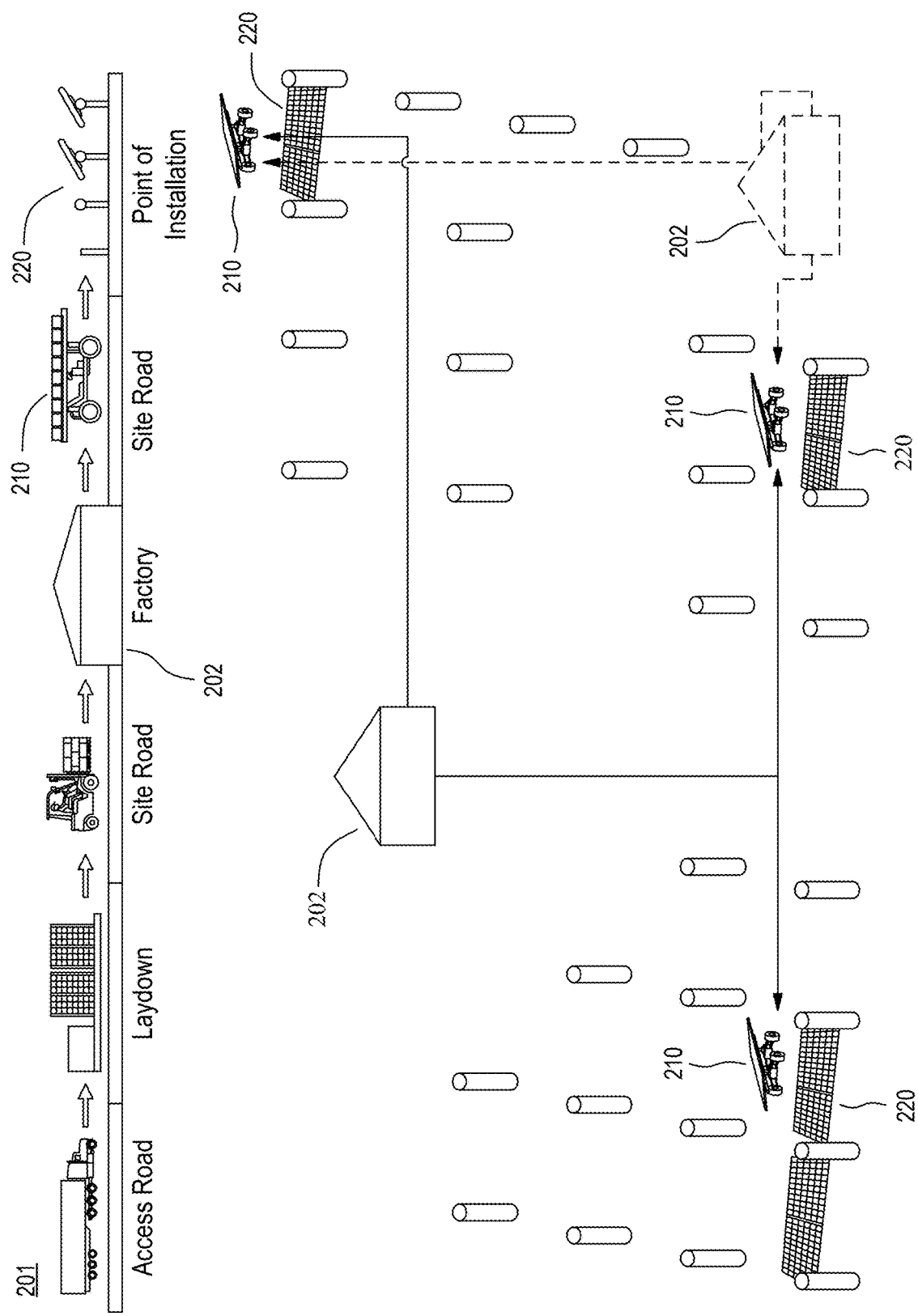
FIG. 2 depicts a centralized solar table assembly and installation for large-scale solar systems according to various embodiments of the invention.

FIG. 2 provides an overview of a centralized solar table assembly and installation for large-scale solar systems according to various embodiments of the invention. Embodiments of the invention transition the traditional approach of distributed assembly and installation at single location sites to a centralized and coordinated assembly factory that allows a more cost-effective and dynamic process of constructing large-scale solar systems. This centralized assembly of solar system components, such as solar tables, necessitates a more robust transport vehicle to move the preassembled components to the installation site.

Resources are brought to construction site 201 for a large-scale solar system and initially processed. These resources are delivered to one or more assembly factories 202 where a coordinated and centralized solar table assembly process is performed. In certain embodiments, a construction site may have multiple centralized factories 202. The location and number of centralized factories 202 may depend on several parameters, including the size of the site, the terrain of the site, the design of the site, and other variables that relate to the construction of the large-scale solar system. Solar table assembling, including automatic fastener installation, may be performed at a centralized factory 202. The assembled solar table may be transported to a point of installation 220 via motorized vehicles 210.

Figure 3:
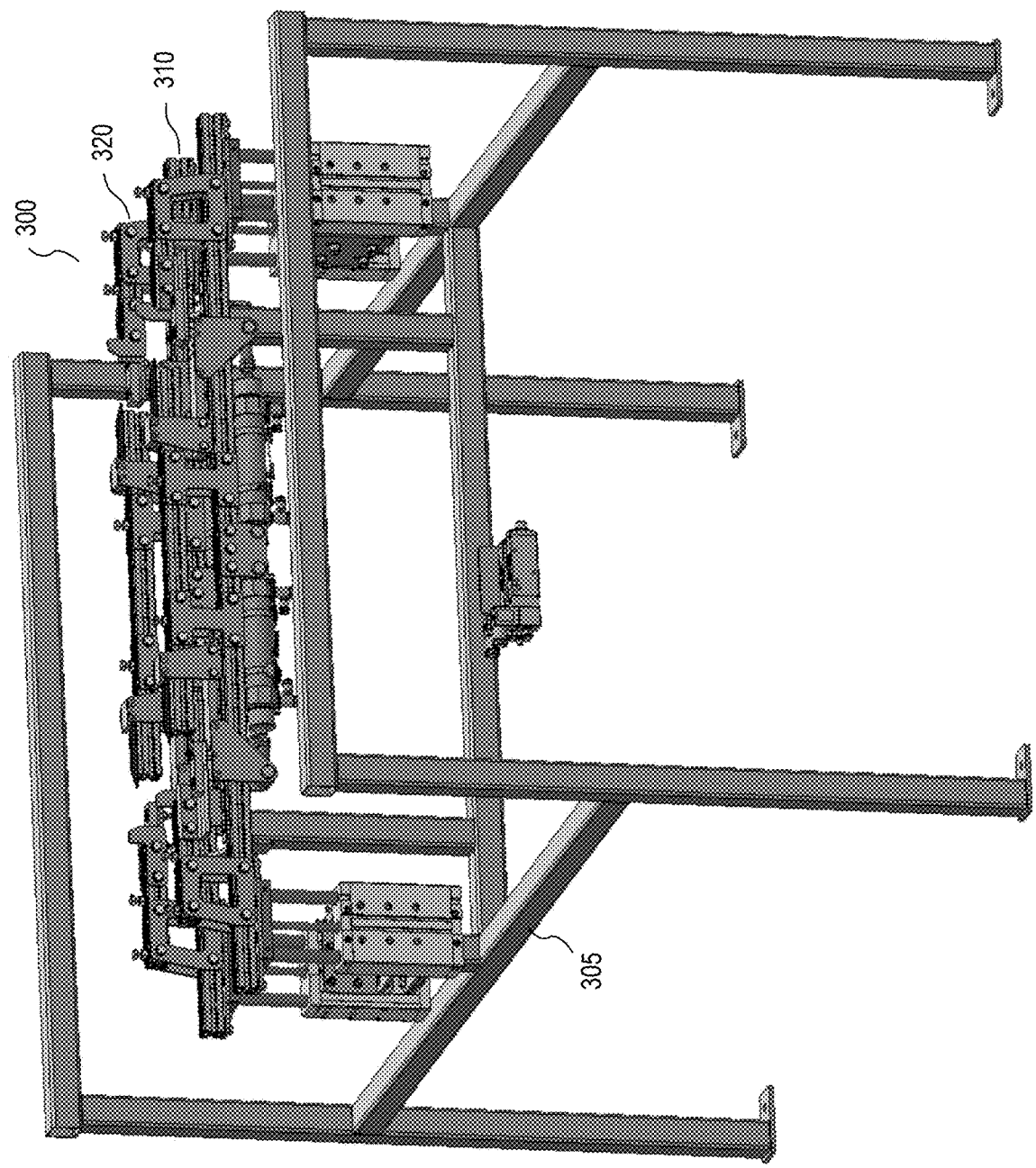
FIG. 3 depicts a perspective view of an automatic fastener installer in accordance with various embodiments of the invention.
Figure 4:
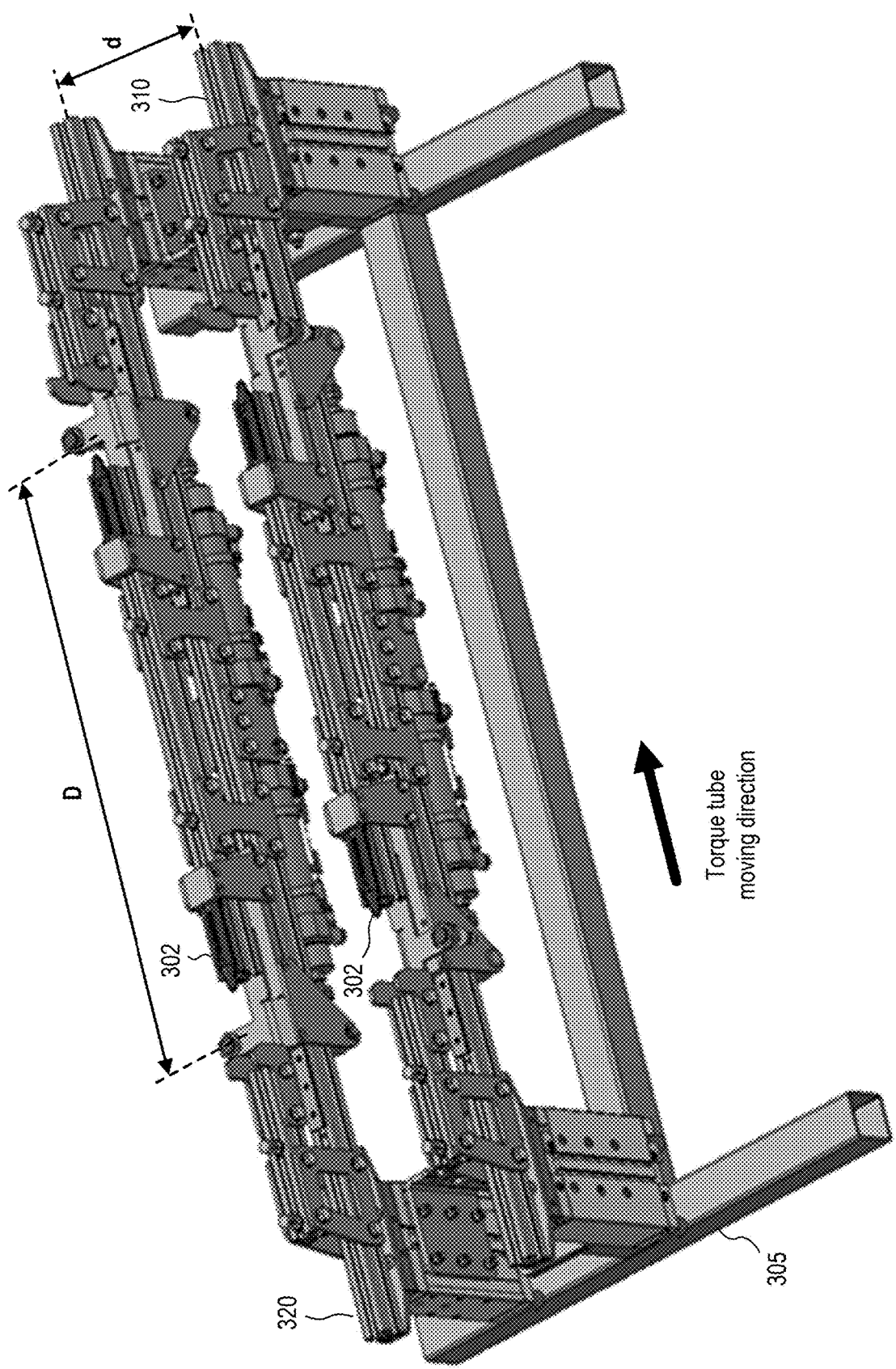
FIG. 4 depicts a close-up view of an automatic fastener installer in accordance with various embodiments of the invention.

FIG. 3 and FIG. 4 depict, respectively, a perspective view and a close-up view of an automatic fastener installer in accordance with various embodiments of the invention. The automatic fastener installer 300 is supported by a supporting frame 305 and comprises a first installer branch 310 and a second installer branch 320 in parallel to the first installer branch 310. The first installer branch 310 and the second installer branch 320 have a distance d, the same as the slot distance shown in FIG. 1. Considering that a mounting bracket typically comprises slots on both sides of the torque tube with a slot distance d, such a twin-branch layout allows the automatic fastener installer 300 to perform a balanced operation for installing fasteners 302 on both slots of the mounting bracket simultaneously. It shall be understood that although an embodiment of a twin-branch configuration is shown in FIG. 3 and FIG. 4, an automatic fastener installer may have a simpler configuration with only one branch to perform one fastener installation at a time. Such a simpler configuration is still within the scope of the present disclosure.

Figure 5A:
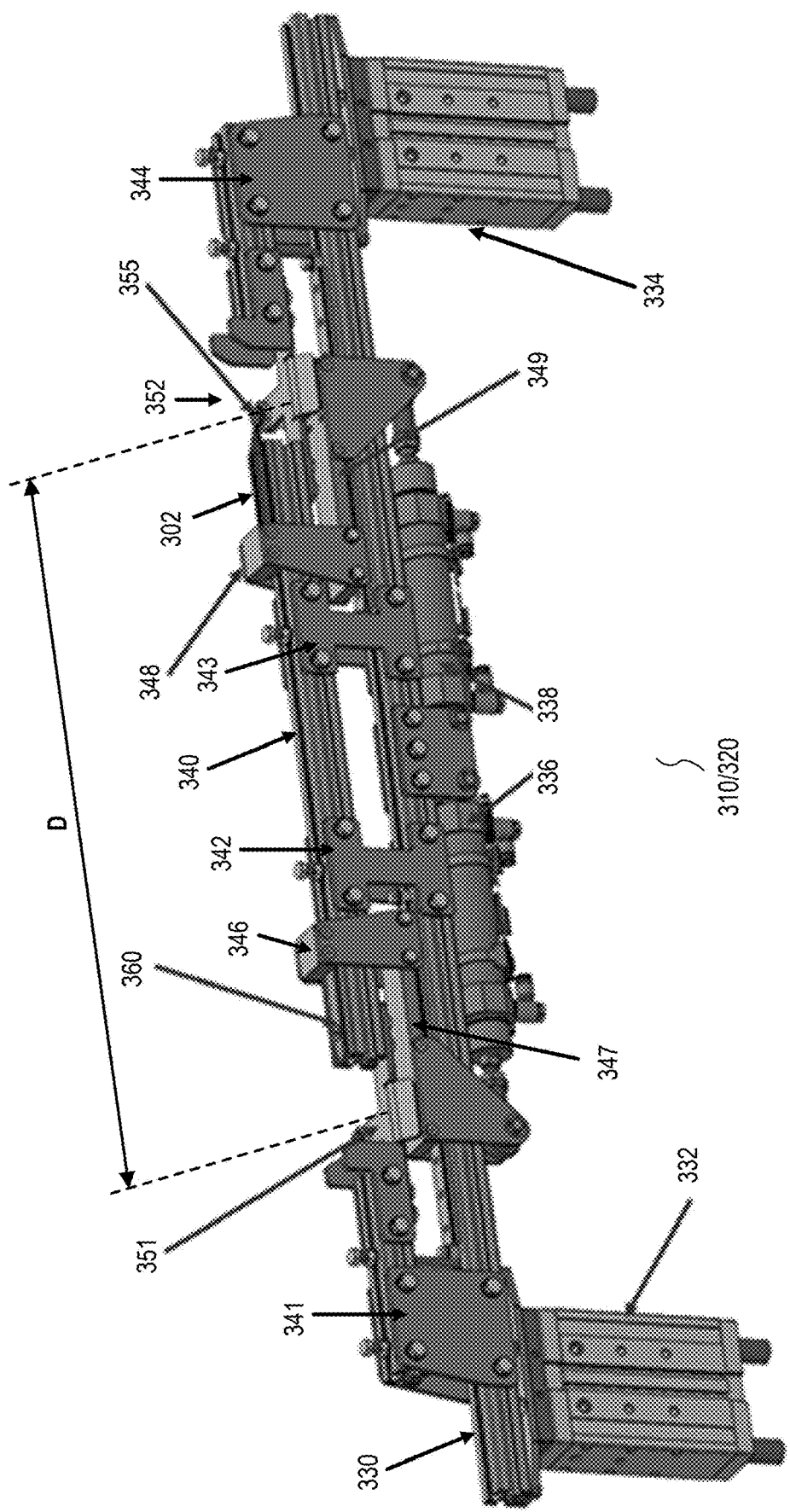
FIG. 5A depicts a close-up view of an installer branch of an automatic fastener installer in accordance with various embodiments of the invention.

FIG. 5A depicts a close-up view of an installer branch of an automatic fastener installer in accordance with various embodiments of the invention. The installer branch 310/320 comprises a first lifter 332 and a second lifter 334 supported by the supporting frame 305 (not shown in FIG. 5A), an installer base frame 330 supported by the lifters 332/334, a first actuator 336 and a second actuator 338 attached to the installer base frame 330, a top frame 340 securely positioned above the installer base frame 330 via one or more coupling brackets 341/342/343/344, a first fastener driving block 346 and a second fastener driving block 348 that are slidable along the top frame 340.

The first lifter 332 and the second lifter 334 may be operated in a lifted position to lift the installer base frame 330 or in a retracted position to lower the installer base frame 330. The first fastener driving block 346 is mechanically coupled to the first actuator 336 via a first fastener sled 347 and the second fastener driving block 348 is mechanically coupled to the first actuator 338 via a second fastener sled 349 such that when the actuators 336/338 are activated for extension, the fastener driving blocks 346/348 are driven to push corresponding fasteners for installation. The actuators 336/338 may be may be electric, pneumatic, or hydraulic actuators. The first actuator 336 and the second fastener driving block 348 are oriented in opposite directions such that the activation momentum of these two actuators may be offset for a smooth operation with minimized impact to the lifters 332/334 and the supporting frame 305.

The first and second fastener sleds decouple the length of the actuators from the distance between the fasteners being installed. The fastener sleds are used to offset the driving force of the actuators from the driving head of the installation tool. The fastener sleds may be mounted atop a linear bearing and track with geometry to interface with the end of the actuator and the driving end of the fastener. Various forms of linear bearing may be used, such as circular rods and bearings, v-shaped or other grooved wheels, interlocking extrusions, etc. The offset provided by the fastener sleds between the end of the actuator and the driving head of the tool allows multiple fasters to be installed simultaneously or in short succession when the components to be fastened are closer than the combined length of the actuator and fastener would normally permit. Members extended above and below the sled interface with the fastener driving blocks and the actuators. These members allow the fastener loading interface and tool frame to be partially enveloped during the installation of fasteners.

The top frame 340 may have a first gap 351 and a second gap 352 such that when the lifters 332/334 are in the lifted position, the fastener driving blocks 346/348 are aligned vertically to the slots of a mounting bracket and ready for installing the fasteners. The first slit 351 and the second slit 352 have a gap distance D same as the frame distance shown in FIG. 1, such that the automatic fastener installer 300 may perform fastener installation for both frames simultaneously and thus be able to finish fastener installation for one module in one operation cycle. In one or more embodiments, a fastener saddle 360 is placed on the top frame 340 next to each fastener driving block and functions as a fastener loading interface to receive and hold a fastener properly.

In one or more embodiments, a module rail sensor 355 may be placed at each gap. When the lifters 332/334 are in the lifted position for the fastener driving blocks in proper alignment with a mounting bracket, the module rail sensor 355 senses a touch or proximity of the mounting bracket to enable subsequent fastener installation. If the module rail sensor 355 does not sense such touch or proximity, the fastener installation may be halted. Accordingly, the module rail sensor 355 ensures the fastener installation is performed only after proper alignment. Therefore, misaligned fastener installation may be avoided.

Figure 5B:
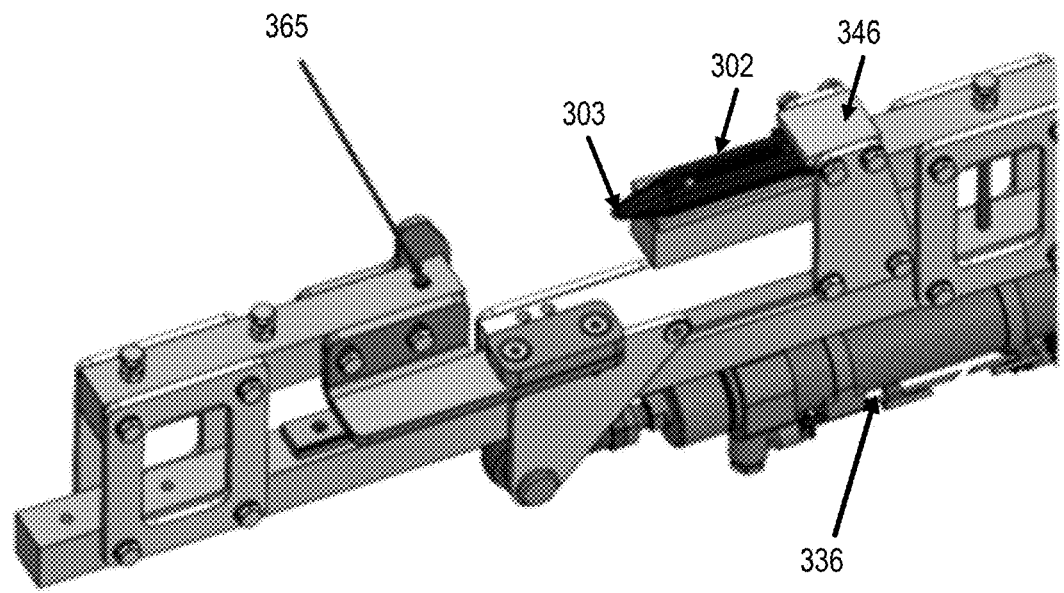
FIG. 5B depicts a proxy sensor on an installer branch to detect the tip of the fastener when it is fully installed in accordance with various embodiments of the invention.
Figure 5B:
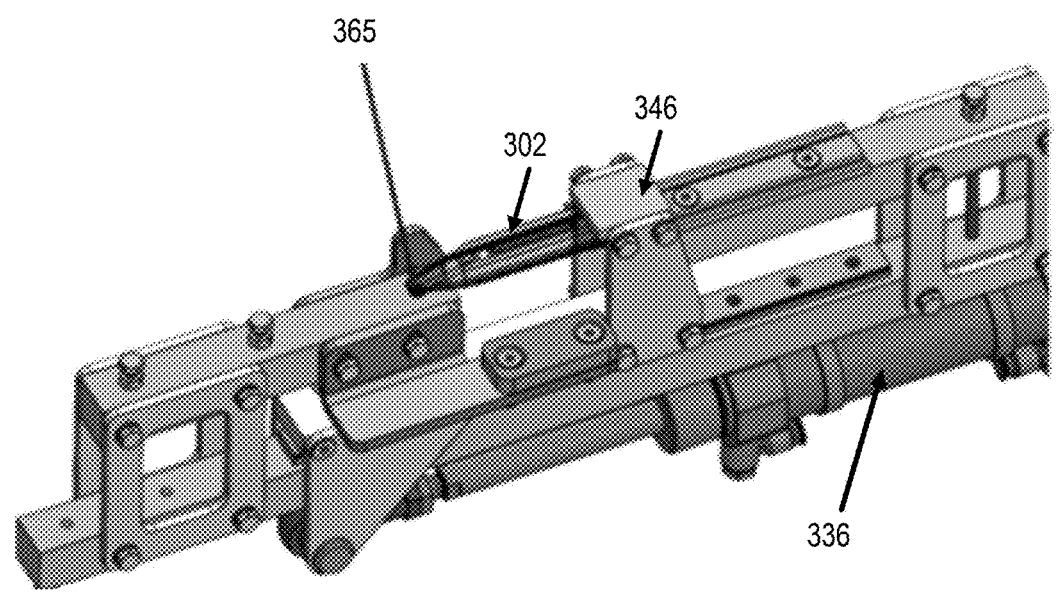

Alternatively, a proximity sensor may be used to detect the tip of an installed fastener to confirm proper installation. FIG. 5B depicts a proxy sensor on an installer branch to detect the tip of the fastener when it is fully installed in accordance with various embodiments of the invention. As shown in FIG. 5B, a proxy sensor 365 may be placed on an installer branch to face the fastener driving blocks 346. Once the fastener 302 is successfully installed onto a slot on a mounting bracket (not shown in FIG. 5B), the tip 303 of the fastener 302 is in proximity of the proxy sensor 365. Therefore, a detection of the tip 303 by the proxy sensor 365 indicates a successful fastener installation. Such a post-installation detection may be implemented in combination of the pre-installation detection (by the module rail sensor 355) for a comprehensive detection for the automatic fastener installation process.

Figure 6:
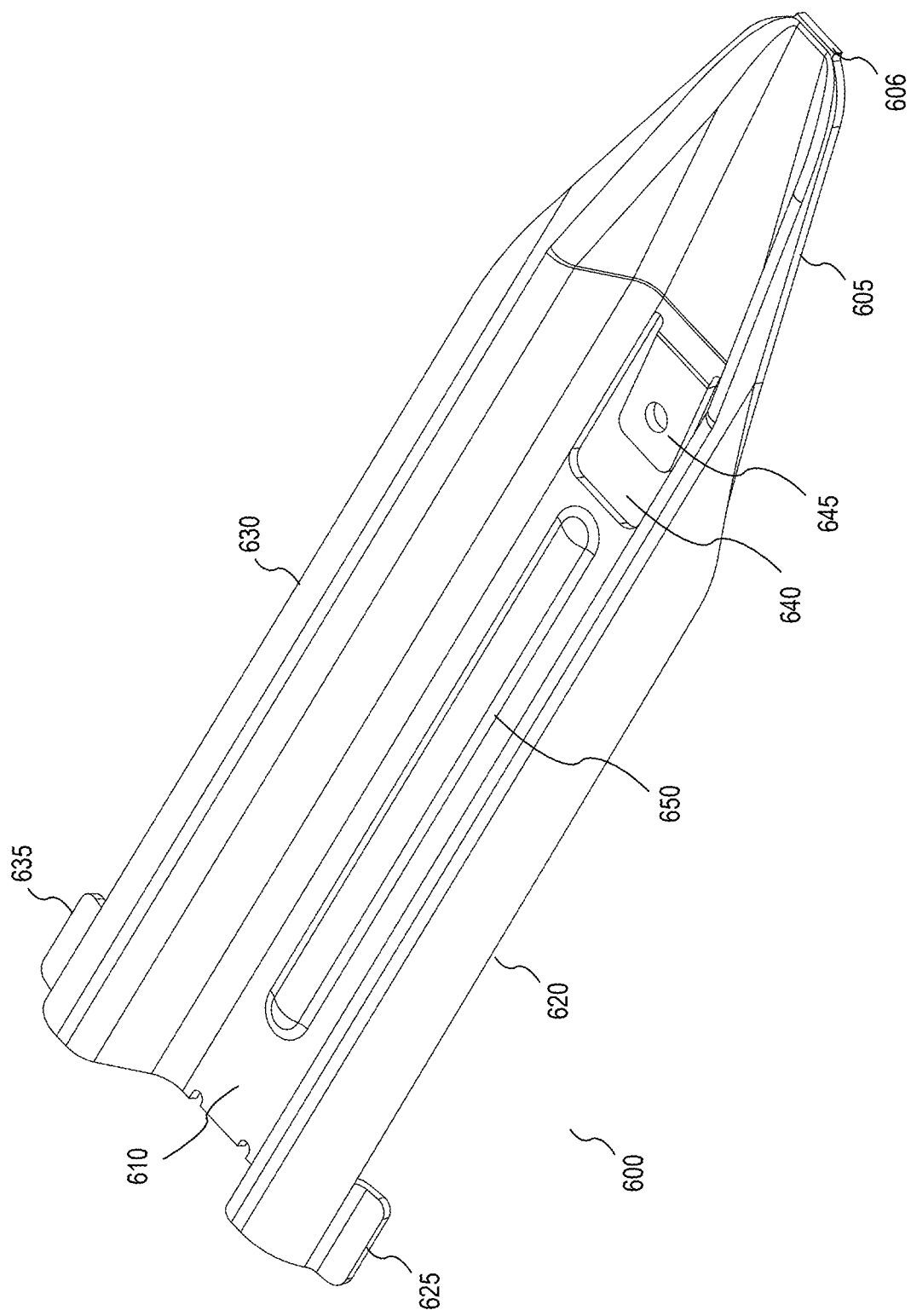
FIG. 6 depicts a perspective view of a fastener in accordance with various embodiments of the invention.

FIG. 6 depicts a perspective view of a fastener in accordance with various embodiments of the invention. The fastener 600, e.g., a wedge, comprises a tapered fastener head 605, which narrows towards a leading fastener end 606, and a fastener body 610, which has an open-curve cross-sectional shape, e.g., a U-shape. The fastener body 610 has a first longitudinal wing 620 and a second longitudinal wing 630 that extend outward. The first longitudinal wing 620 and the second longitudinal wing 630 have a first tail protrusion 625 and a second tail protrusion 635, which protrude cross-sectionally beyond the longitudinal wings.

In one or more embodiments, the fastener body 610 may have an opening 640 in the proximity of the tapered fastener head 605 and a tab 645, protruding from the opening, slightly beyond the fastener body 610 in a normal state and extending in a direction away from the tapered fastener head 605. The tab 645 may be compressed inwardly in a compressed state when the fastener is pushed through a slot. Once the tab 645 passes the slot, the tab emerges from the compressed state and prevents the fastener from backing out of the slot. The tab and the first and second tail protrusions may jointly lock the fastener in an engaged position and prevent the fastener from moving away forwardly or backwardly from the engaged position.

For long-term durability, the fastener 600 may be made of hard metal or alloy, such as steel or zinc-coated steel. The fastener body 610 may have a cross-section slightly larger than a slot. When the fastener 600 is pushed across the slot, the first longitudinal wing 620 and the second longitudinal wing 630 may be compressed inwardly by the slot. Such compression may prevent the fastener 600 from sliding along the slot and thus hold the fastener 600 still once the fastener 600 is engaged. The fastener 600 may further comprise a reinforcing rib 650 longitudinally placed on the fastener body 610 to increase the stiffness of the fastener 600.

In one or more embodiments, the tab 645 may extend in a direction perpendicular to the longitudinal wings 620 and 630, as shown in FIG. 6. Such an offset arrangement ensures that the locking mechanisms of wing compression and tab extrusion may function in synergy for optimized fastener locking. One skilled in the art shall recognize that the fastener may be modified and/or supplemented with various structural and function elements to further assist in fastener locking.

Figure 7A:
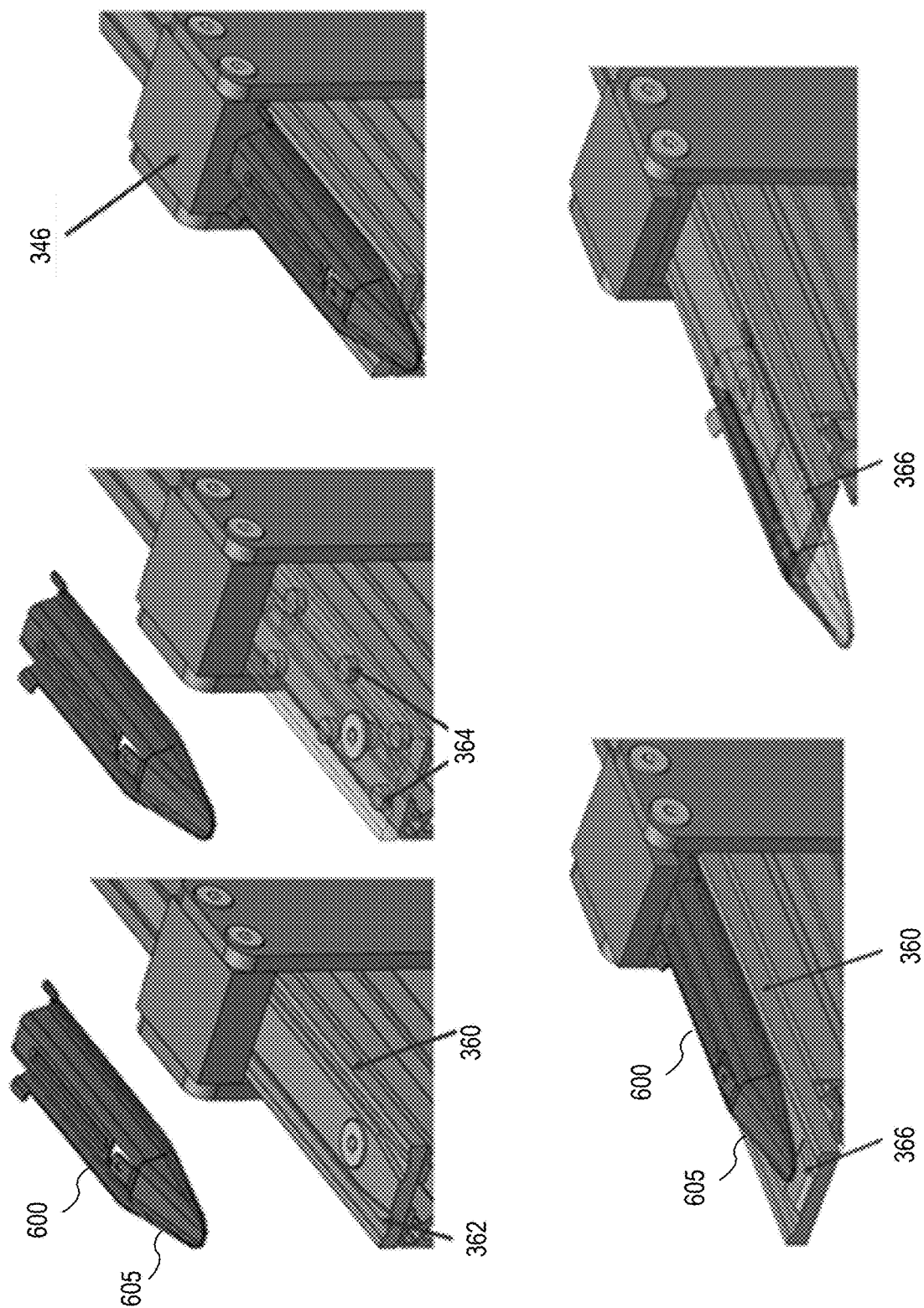
FIG. 7A depicts various fastener-loading interfaces of an automatic fastener installer in accordance with various embodiments of the invention.

FIG. 7A depicts various fastener-loading interfaces of an automatic fastener installer in accordance with various embodiments of the invention. The fastener saddle 360 functions as a fastener loading interface to receive and hold a fastener 600 properly. As shown in FIG. 7A, the fastener saddle 360 may have front grooves 362 that match the tapered fastener head 605 of the fastener 600 to ensure correct positioning of the fastener 600 on the fastener saddle 360. Furthermore, the fastener saddle 360 may have one or more embedded magnets 364 to retain the fastener 600 in place, considering that the fastener 600 is typically made from steel or zinc-coated steel.

Alternatively, the fastener saddle 360 may have a riser 366 instead of having the front grooves 362. The riser 366 lifts the tapered wedge head 605 during the initial portion of the fastener installation and is enveloped within the wedge body 610 to keep the fastener 600 flat when the fastener 600 is pushed by the fastener driving block 346 for installation. The rise of the fastener head 605 provided by the riser 366 aids the fastener in getting through the slot 126 in the mounting bracket 125 because the tip of the fastener 606 is biased to one side.

Figure 7B:
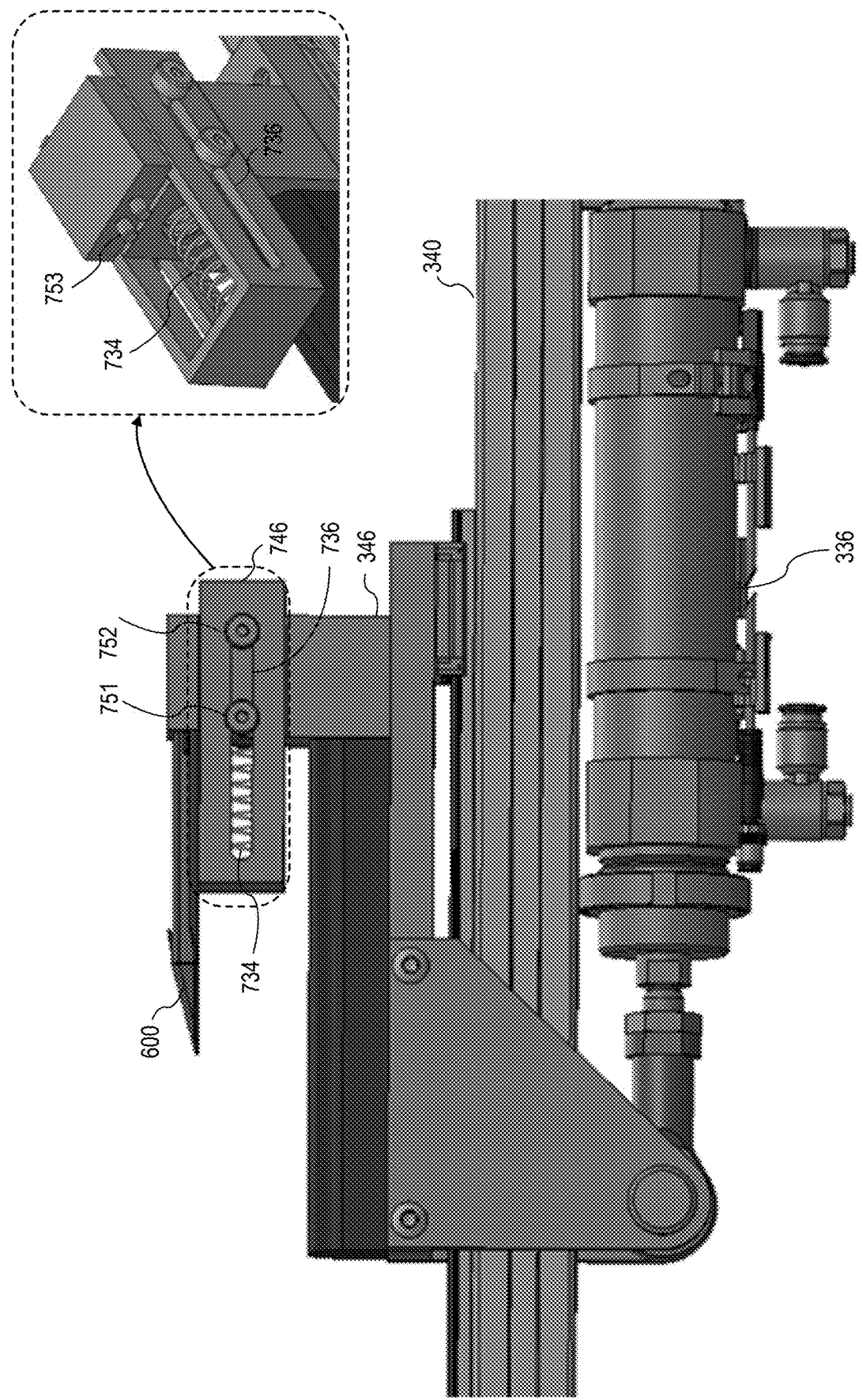
FIG. 7B depicts a spring-loaded fastener-loading interface of an automatic fastener installer in accordance with various embodiments of the invention.

FIG. 7B depicts a spring-loaded fastener-loading interface of an automatic fastener installer in accordance with various embodiments of the invention. Different from the fastener saddle 360 placed on the top frame 340, the spring-loaded fastener-loading interface 746 is slidably attached to the fastener driving block 346 via a pair of pins 751/752 (or linear bearings or guide rods) mounted on each side of the driving block 346 and is biased by an internal spring 734 to an extended position to support a fastener 600. The fastener-loading interface 746 provides support for the fastener through the entire installation cycle and especially during the installation stroke. The pins 751/752 helps secure the fastener and keeps it from falling out during the process. Additionally, the driving block 346 may incorporate one or more support pins 753 that are used to support the tail of the fastener 600.

Once the actuator 336 is activated to implement fastener installation into a slot of a mounting bracket, the fastener driving block 346 is driven to push the fastener 600 into the slot to complete the installation while the spring-loaded fastener-loading interface 746 touches the mounting bracket and slides via a groove 736 along fastener driving block 346 into a compressed position. Once the actuator 336 is deactivated to retract, the spring-loaded fastener-loading interface 746 extends automatically by the internal spring 734 to receive the next fastener for subsequent operations.

Figure 8:
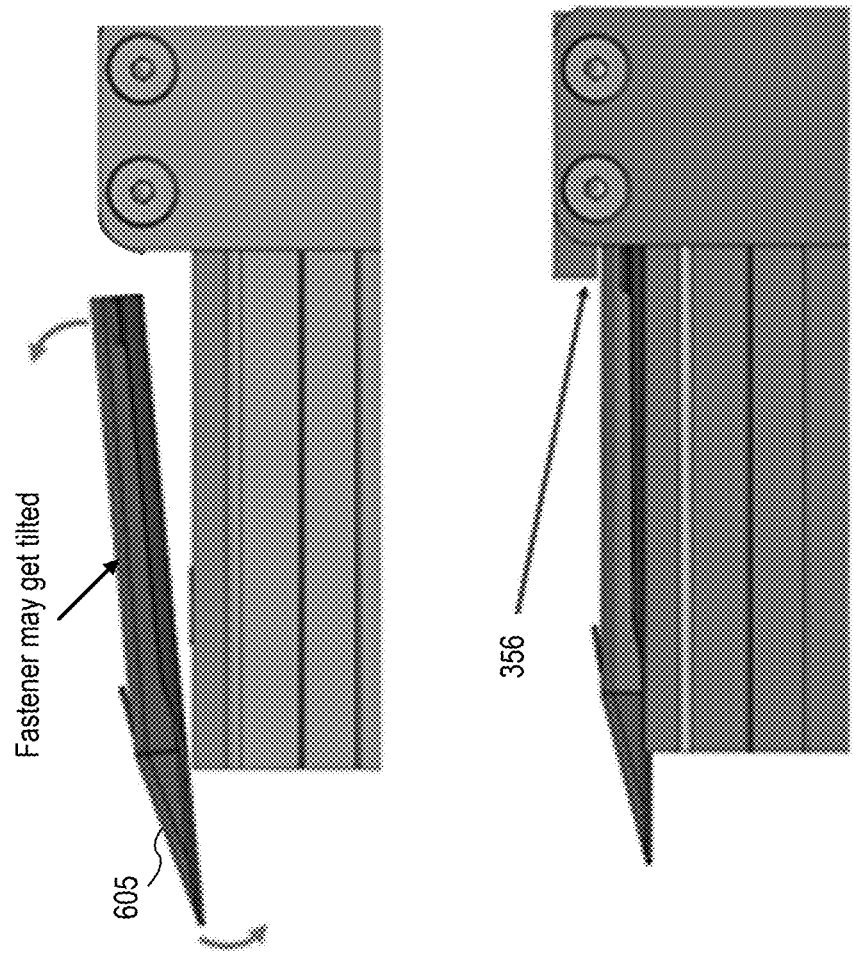
FIG. 8 depicts a driving interface of an automatic fastener installer in accordance with various embodiments of the invention.
Figure 8:
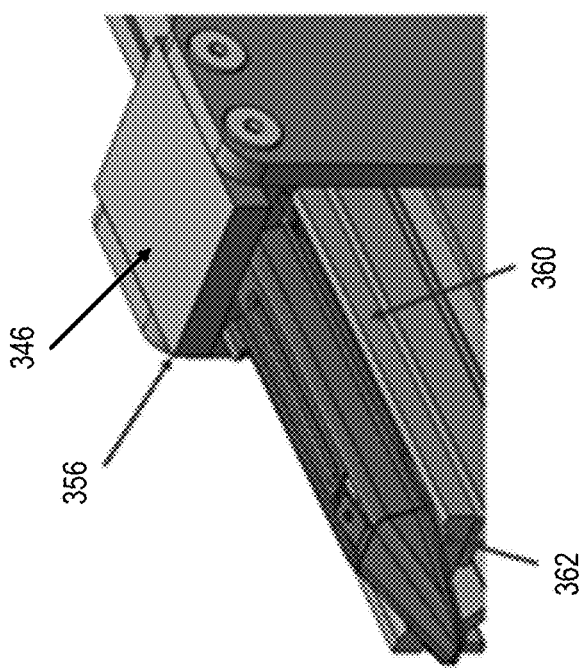

FIG. 8 depicts a driving interface of an automatic fastener installer in accordance with various embodiments of the invention. Once the fastener 600 is pushed by the fastener driving block 346 away from the fastener saddle 360 for installation, the fastener 600 may be tilted since the fastener head 605 is no longer supported and, therefore, may cause a failed installation. To prevent this, the fastener driving block 346 may incorporate an overhang 356 positioned above the tail (e.g., the first tail protrusion 625 and the second tail protrusion 635) of the fastener 600. The overhang 356 may effectively prevent the fastener 600 from tilting when the fastener 600 is pushed for installation. In summary, the capture feature can be done with an overhang 356, the front grooves 362, or the support pins 753 that keep the fastener from tilting.

Figure 11:
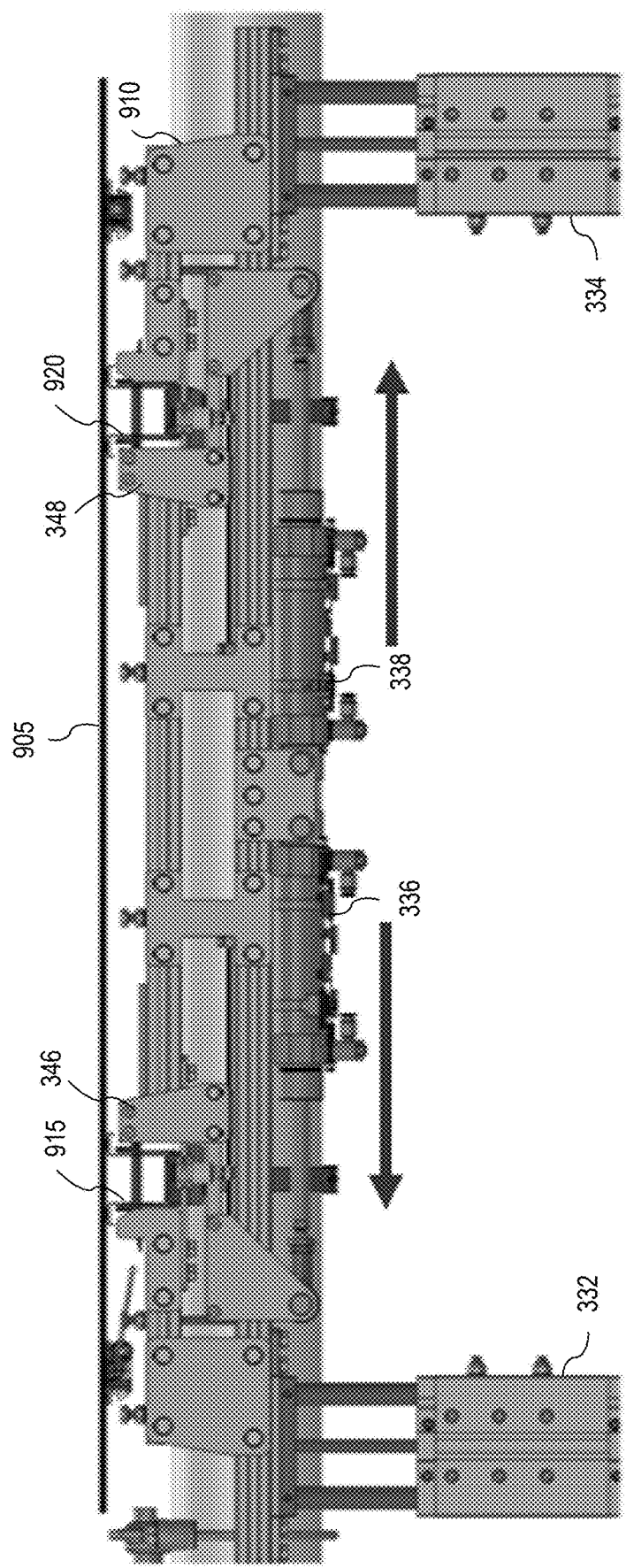
FIG. 11 depicts a fastener driving stage of a fastener installation cycle in accordance with various embodiments of the invention.
Figure 12:
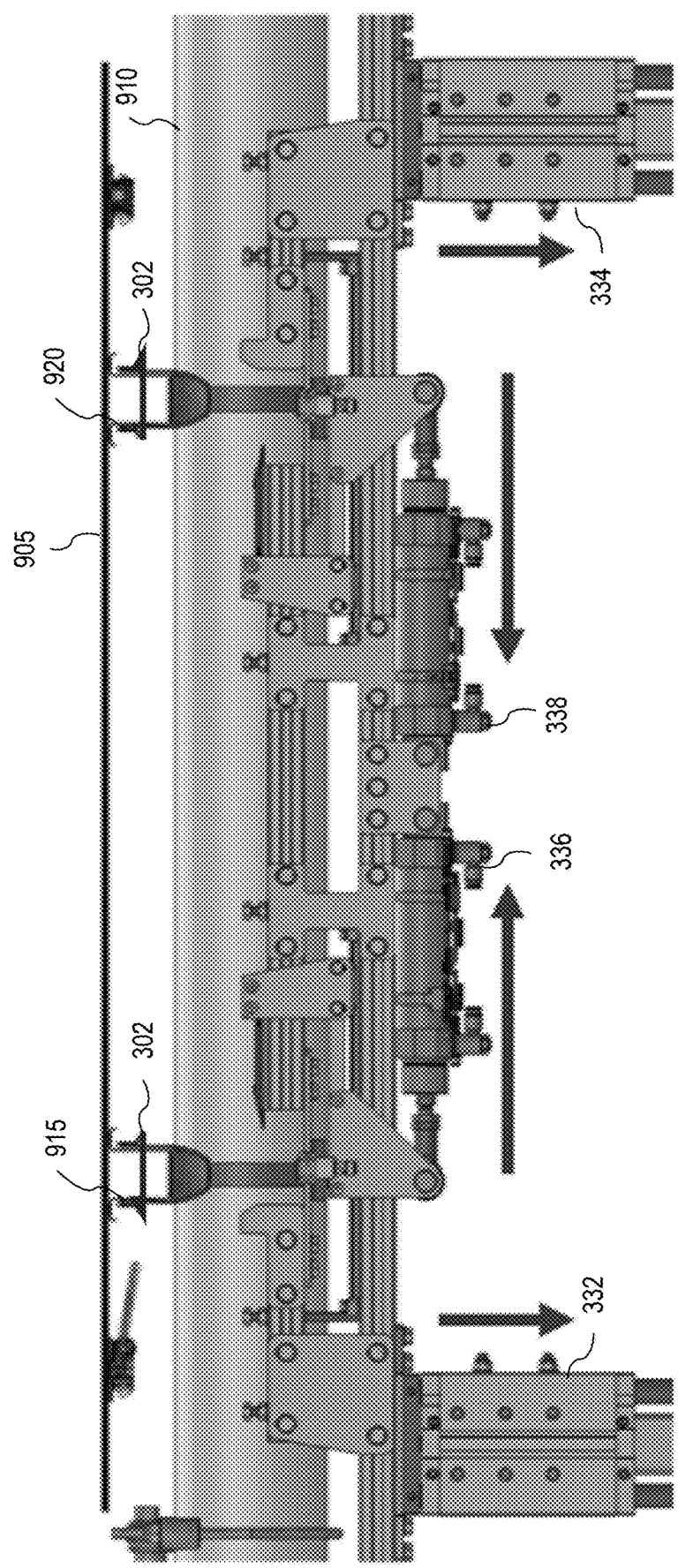
FIG. 12 depicts an actuator/lifter retracting stage of a fastener installation cycle in accordance with various embodiments of the invention.
Figure 13:
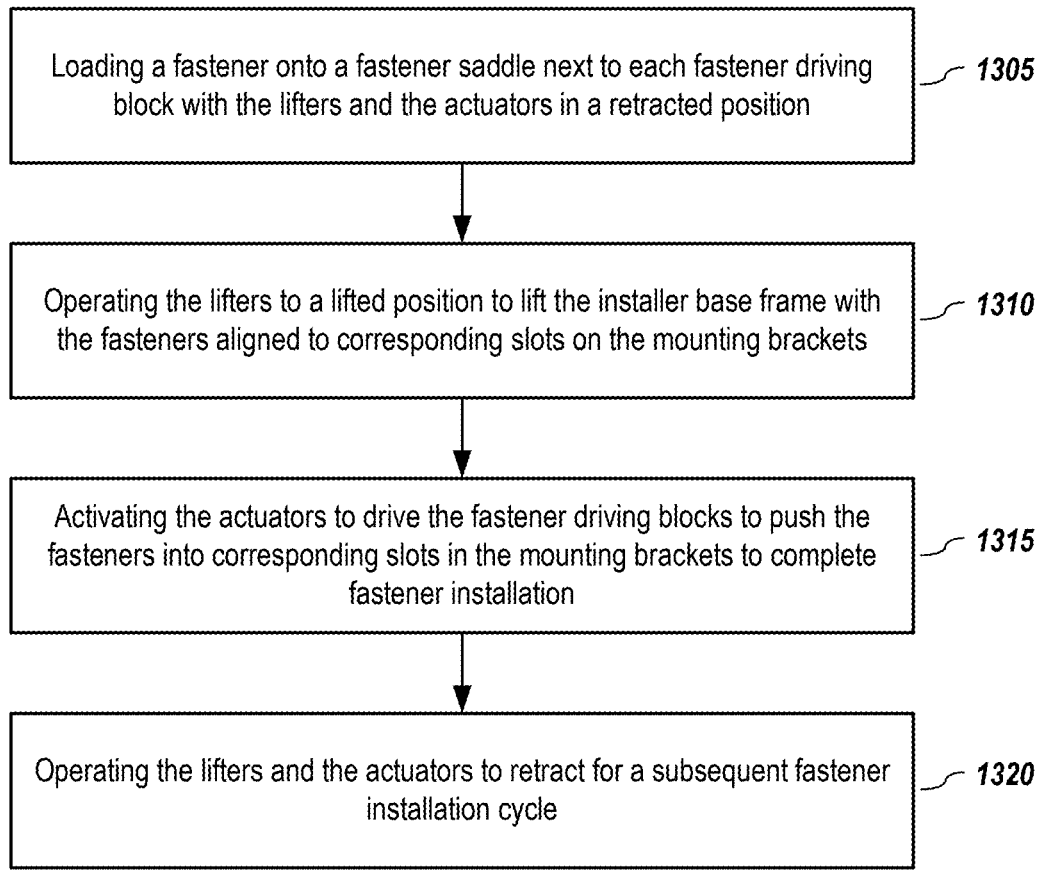
FIG. 13 depicts a process for automatic fastener installation in accordance with various embodiments of the invention.

FIGS. 9-12 graphically depict different stages of a fastener installation cycle, and FIG. 13 depicts a corresponding process for automatic fastener installation in accordance with various embodiments of the invention. It shall be noted FIGS. 9-12 are side views with only one installer branch shown in the figures, while another installer branch is behind the scenes and performs operations in parallel.

Figure 9:
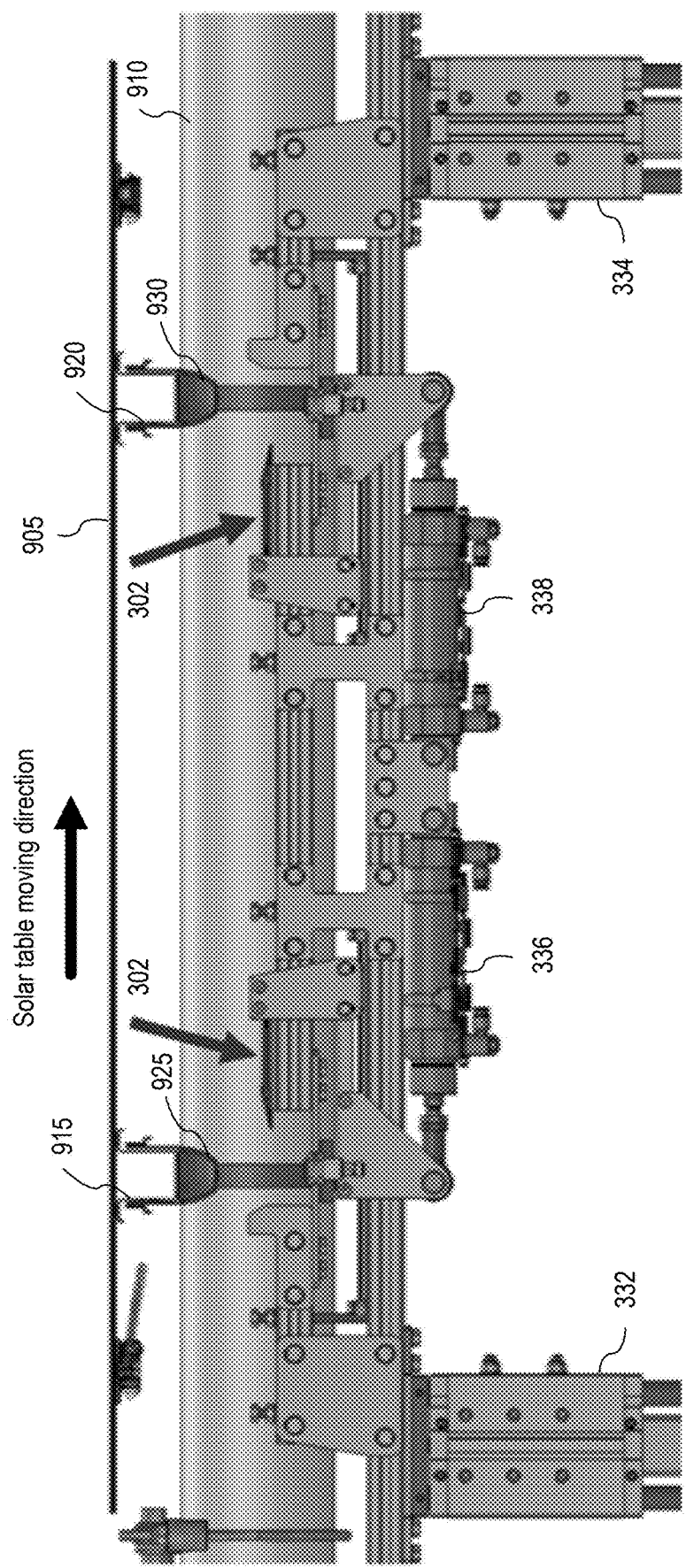
FIG. 9 depicts a fastener loading stage of a fastener installation cycle in accordance with various embodiments of the invention.

In step 1305, a fastener 302 is loaded onto a fastener saddle next to each fastener driving block, as shown in a fastener loading stage in FIG. 9, with the lifters 332/334 and the actuators 336/338 in a retracted position. In the meantime, a torque tube 910 with attached mounting brackets 925/930 is moved along an assembly line to stop by the automatic fastener installer 300. Potentially, the modules rails may be attached to the modules first and then fastened to the torque tube. A solar module 905 is dropped by a module-handling robot onto the torque tube 910 with the module frames 915/925 aligned to the mounting brackets 925/930, awaiting fastener installation to securely lock the module frames 915/925 onto the mounting brackets 925/930. In one or more embodiments, the fastener may be loaded onto the fastener saddle automatically by a piece of automated equipment that can repeat a number of steps in sequence with the option to have feedback sensors.

Figure 10:
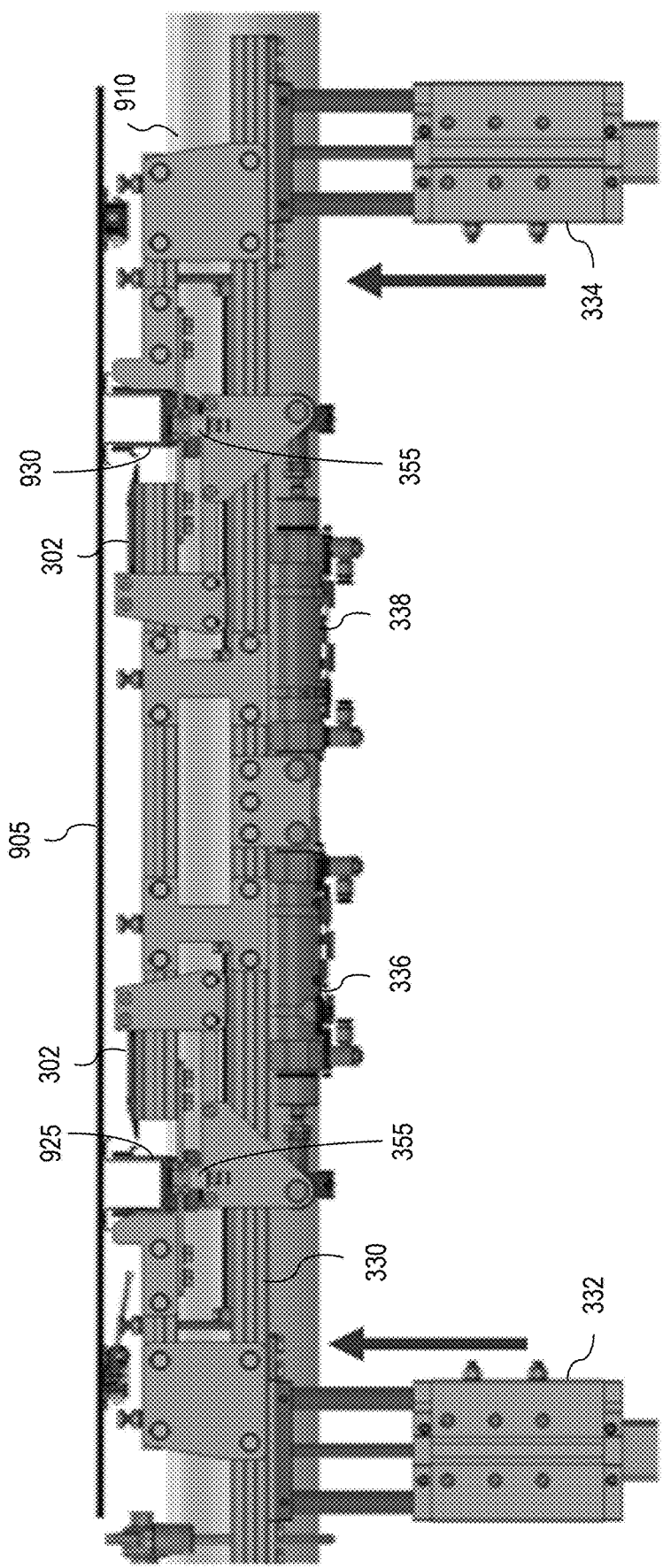
FIG. 10 depicts a fastener positioning stage of a fastener installation cycle in accordance with various embodiments of the invention.

In step 1310, the lifters 332/334 are operated to a lifted position to lift the installer base frame 330, as shown in a fastener positioning stage in FIG. 10, with the fasteners 302 aligned to corresponding slots on the mounting brackets 925/930. In the meantime, the module rail sensor 355 senses a touch or proximity of the mounting bracket to enable subsequent fastener installation.

In step 1315, the actuators 336/338 are activated to drive the fastener driving blocks 346/348, as shown in a fastener driving stage in FIG. 11, and thus, push the fasteners into corresponding slots in the mounting slots to complete fastener installation.

In step 1320, the lifters 332/334 and the actuators 336/338 are operated to retract, as shown in an actuator/lifter retracting stage in FIG. 12, for a subsequent fastener installation cycle. In the meantime, the assembled solar table with the module frames securely locked onto the mounting brackets is moved away from the automatic fastener installer 300 to clear space for fastener installation for a subsequent solar panel or table to be assembled.

As shown in FIGS. 9-12, the automatic fastener installer 300 is able to complete fastener installation for one solar module within one fastener installation cycle. Such an installation pace ensures efficient and consistent fastener installation and thus greatly improves the automatic assembly process for solar tables.

Figure 14:
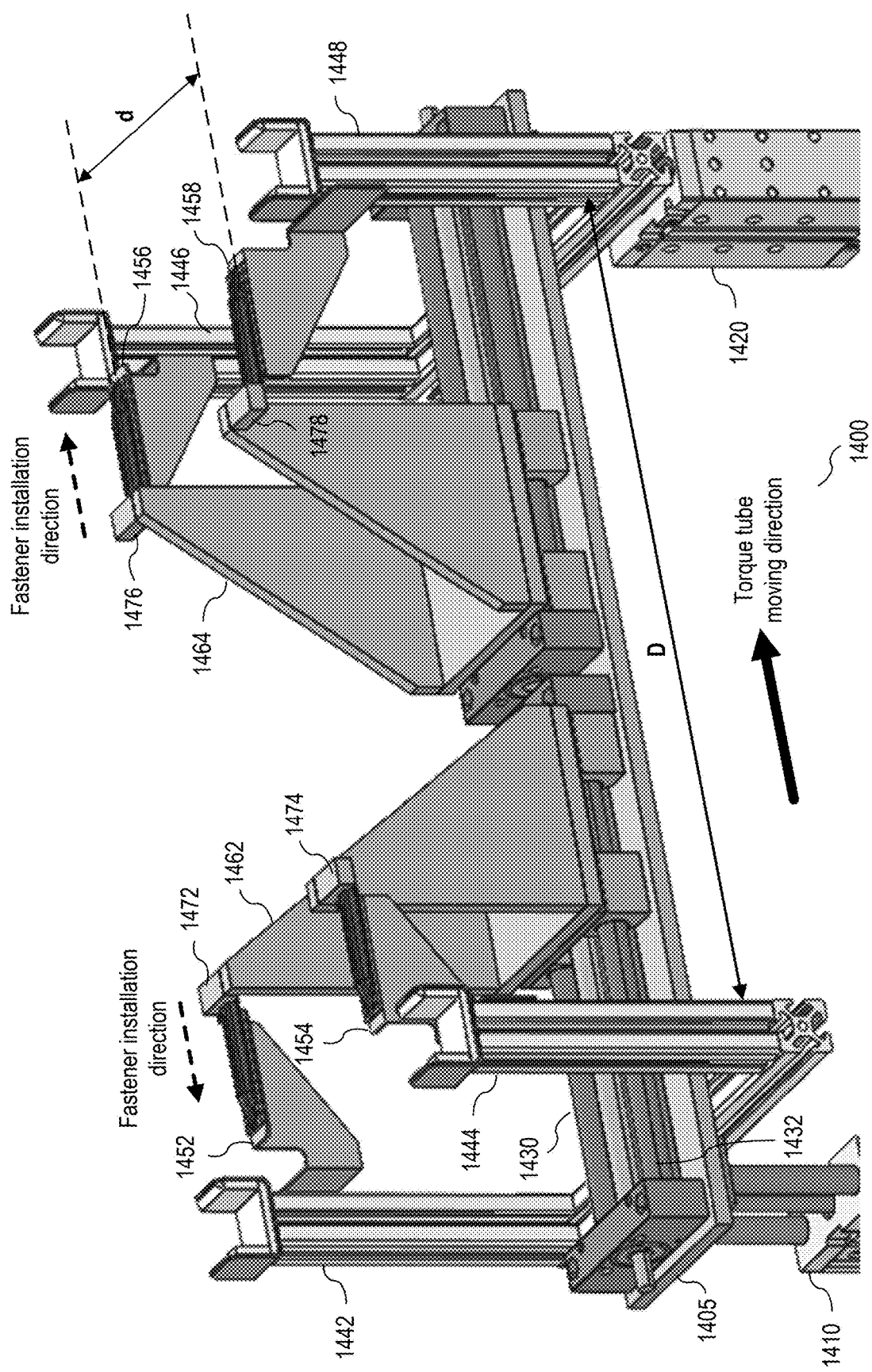
FIG. 14 depicts a perspective view of a fastener installer with shared base frames in accordance with various embodiments of the invention.

Although the aforementioned description discloses embodiments of an automatic fastener installer with two installer branches, with each branch having its own base frame, one skilled in the art shall understand the automatic fastener installer may have various configurations other than two parallel installer branches. FIG. 14 depicts a perspective view of a fastener installer with shared base frames in accordance with various embodiments of the invention. The automatic fastener installer 1400 comprises a supporting frame 1405 supported by a first lifter 1410 and a second lifter 1420, one or more actuators 1430/1432 attached to the supporting frame 1405, a first base frame 1462 and a second base frame 1464 that are driven by the one or more actuator 1430/1432 to slide along the supporting frame 1405, four pillars 1442/1444/1446/1448 distributed around the supporting frame 1405 to respectively support four fastener holders 1452/1454/1456/1458. The first base frame 1462 couples to a first fastener driving block 1472 and a second fastener driving block 1474 such that the first base frame 1462 may be used to push fasteners placed on the first and second fastener holders 1452/1454 for fastener installation. Similarly, the second base frame 1464 couples to a third fastener driving block 1476 and a fourth fastener driving block 1478 such that the second base frame 1464 may be used to push fasteners placed on the third and fourth fastener holders 1456/1458 for fastener installation.

The fastener driving blocks sharing the same base frame have a distance d, which is the same as the slot distance shown in FIG. 1. For example, the third fastener driving block 1476 and the fourth fastener driving block 1478 have a distance d. Furthermore, the distance of fastener holders coupled to different base frames have a distance D, the same as the module frame distance shown in FIG. 1, such that the automatic fastener installer 1400 may perform fastener installation for both frames simultaneously and thus be able to finish fastener installation for one module in one operation cycle.

Figure 15:
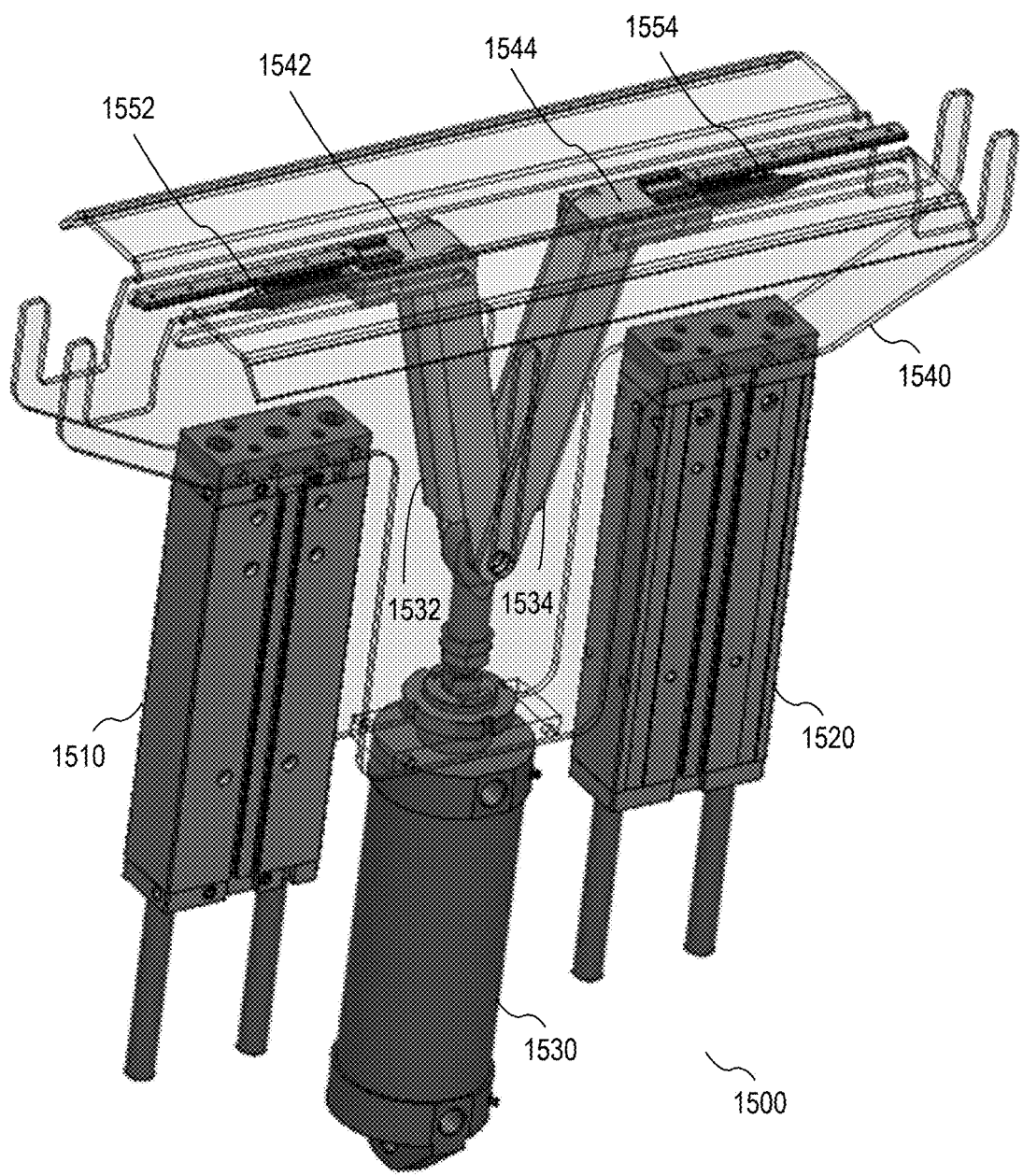
FIG. 15 depicts a perspective view of a single actuator that drives multiple fastener driving blocks in accordance with various embodiments of the invention.

In one or more embodiments, one actuator may be used to drive multiple fastener driving blocks for fastener installation in opposite directions. FIG. 15 depicts a perspective view of such a single actuator in accordance with various embodiments of the invention. The fastener installer branch 1500 comprises a supporting frame 1405 supported by a first lifter 1510 and a second lifter 1520, an actuator 1530, a supporting frame 1540 that can be raised or lowered by the first and second lifters, a first fastener driving block 1542 and a second fastener driving block 1544 driven by the actuator 1530 via a first connection rod 1532 and a second connection rod 1534 respectively. The first connection rod 1532 is pivotably coupled to the actuator 1530 and the first fastener driving block 1542. Similarly, the second connection rod 1534 is pivotably coupled to the actuator 1530 and the second fastener driving block 1544. When the actuator 1530 is activated to push the first connection rod 1532 and the second connection rod 1534, both the first fastener driving block 1542 and the second fastener driving block 1544 may be driven to push corresponding fasteners 1552/1554 for installation.

Although the embodiment shown in FIG. 15 is for one installer branch, the configuration may also be adapted for a single actuator for two branches. For example, the actuator may connect to a level rod, which couples to two sets of connection rods, with each set of rods driving a pair of fastener driving blocks. In this way, one actuator may be used to drive the installation of four fasteners, thus completing fastener installation for a solar module in one operation cycle.

Figure 16:
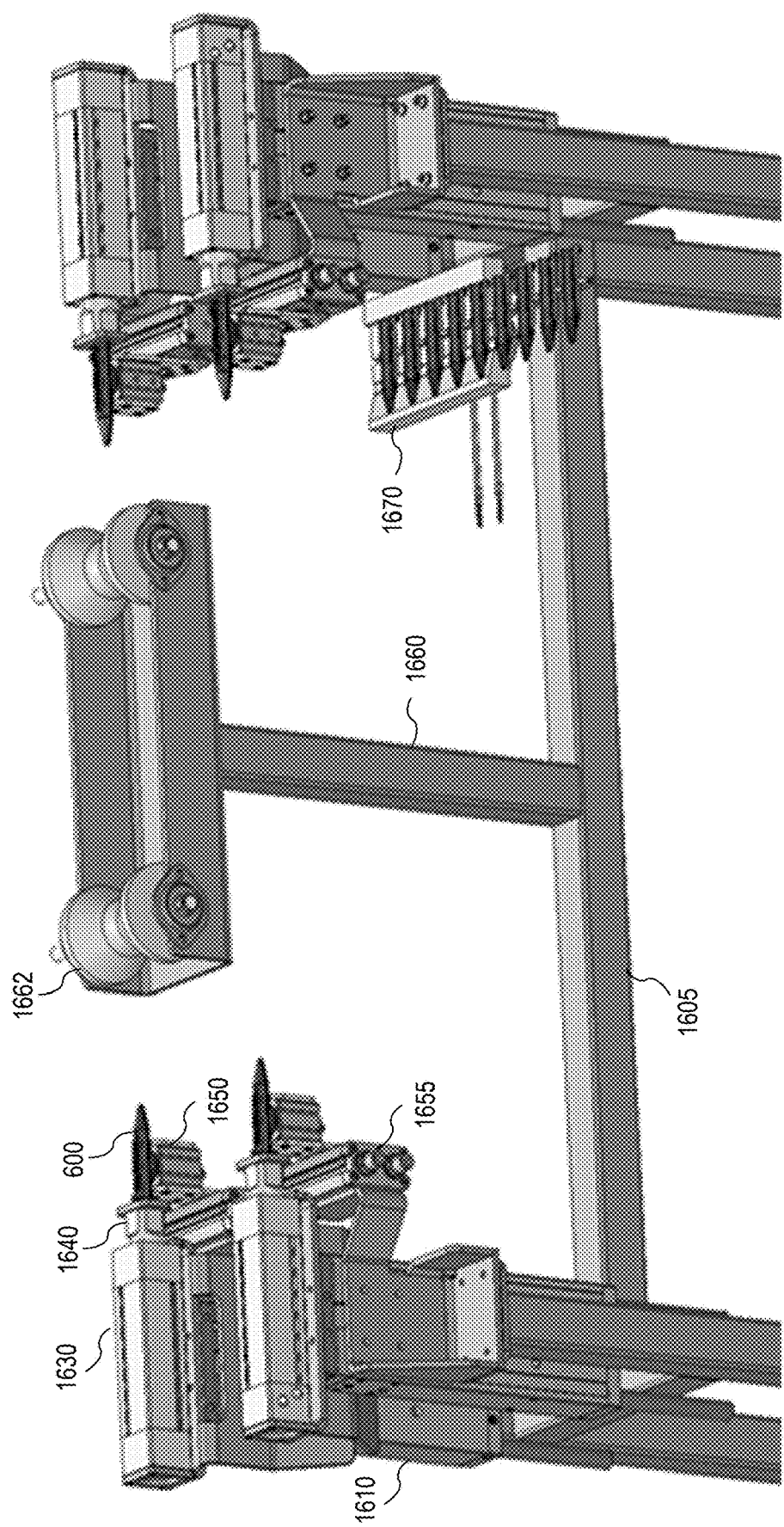
FIG. 16 depicts a perspective view of a fastener installer with fastener driving blocks directly driven by actuators with various embodiments of the invention.

In one or more embodiments, an actuator may drive a fastener driving block directly for a compact structure layout. FIG. 16 depicts a perspective view of a fastener installer with fastener driving blocks directly driven by actuators with various embodiments of the invention. The automatic fastener installer 1600 comprises a supporting frame 1605, multiple lifters 1610 supported by a supporting frame 1605, an actuator 1630 coupled to each lifter, a fastener driving block 1640 directly driven by each actuator 1630. When activated, the actuator 1630 directly pushes the fastener driving block 1640 for installation of a fastener 600, which is placed on a corresponding fastener holder 1650. The automatic fastener installer 1600 may further comprise a solar torque tube support frame 1660 with one or more tube rollers 1662 on top to mechanically support a solar table when installing fasteners for the solar table.

Figure 17:
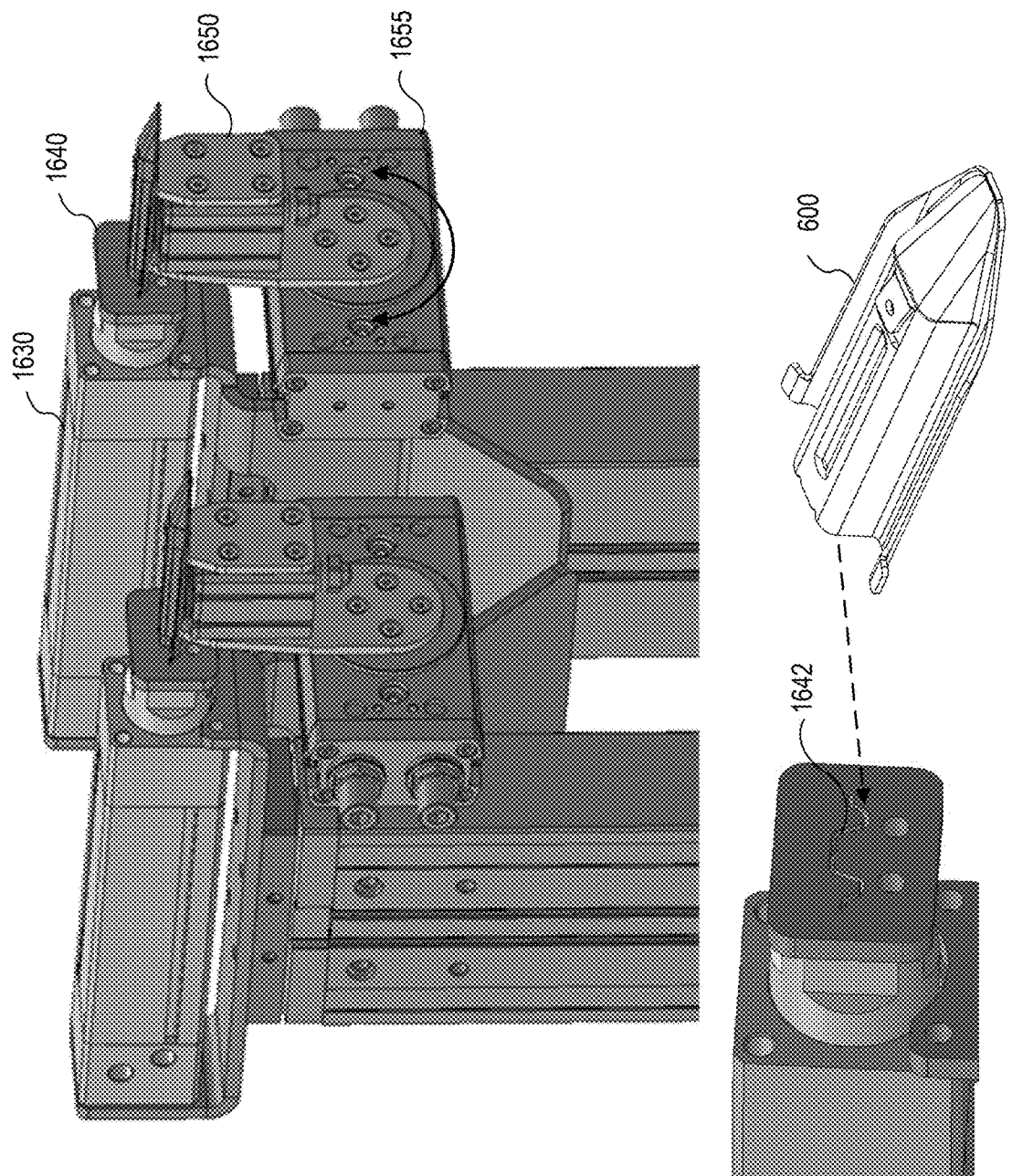
FIG. 17 depicts a close-up view of a fastener driving block directly driven by an actuator in accordance with various embodiments of the invention.

FIG. 17 depicts a close-up view of a fastener driving block directly driven by an actuator in accordance with various embodiments of the invention. The fastener driving block 1640 comprises a slot 1642 that matches the tail profile of the fastener 600 such that the fastener 600 may be partially inserted into the slot for fastener installation stability when the fastener driving block 1640 is driven by the actuator 1630 for fastener installation operation.

The fastener holder 1650 may be made from magnetic material and rotably attached to a holder frame 1655. The fastener holder 1650 is rotated downwardly to fetch a fastener from a fastener conveyor 1670 and holds the fastener when rotated upwardly for fastener installation. Once the fastener is partially inserted, e.g., with its tapered fastener head 605 inserted, into a slot on a mounting bracket, the fastener holder 1650 is rotated downwardly to clear the space for fastener installation completion.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. An automatic fastener installer for solar table assembling comprising:
one or more installer branches operable by one or more lifters to be in a lifted position or a retracted position, each installer branch comprising:
an installer base frame;
one or more actuators attached to the installer base frame;
a top frame positioned above the installer base frame via one or more coupling brackets;
a first fastener driving block that is driven by the one or more actuators to slide along the top frame to install a first fastener into a slot of a first mounting bracket to lock a first solar module frame onto the first mounting bracket; and
a second fastener driving block that is mechanically driven by the one or more actuators to slide along the top frame to install a second fastener into a slot of a second mounting bracket to lock a second solar module frame onto the second mounting bracket.

2. The automatic fastener installer for solar table assembling of claim 1, wherein the one or more installer branches comprise two installer branches to perform fastener installation operations in parallel, the two installer branches are spaced apart by a distance.

3. The automatic fastener installer for solar table assembling of claim 1, wherein the one or more actuators comprise a first actuator and a second actuator that are oriented in opposite directions.

4. The automatic fastener installer for solar table assembling of claim 3, wherein the first actuator and the second actuator are electric, pneumatic, or hydraulic actuators.

5. The automatic fastener installer for solar table assembling of claim 3, wherein the first fastener driving block is mechanically driven by the first actuator via a first fastener sled, and the second fastener driving block is mechanically driven by the second actuator via a second fastener sled.

6. The automatic fastener installer for solar table assembling of claim 1, wherein the top frame has a first gap and a second gap to align respectively to the first mounting bracket and the second mounting bracket for fastener installation when the one or more installer branches are in the lifted position.

7. The automatic fastener installer for solar table assembling of claim 6 further comprising:
a module rail sensor placed at each of the first and second gaps to sense a touch or proximity of the first or the second mounting bracket to enable subsequent fastener installation when the one or more installer branches are in the lifted position.

8. The automatic fastener installer for solar table assembling of claim 1 further comprising:
a fastener-loading interface to receive and hold the first or second fastener, the fastener-loading interface is a spring-loaded fastener-loading interface or a fastener saddle placed on the top frame next to each of the first and second fastener driving blocks.

9. The automatic fastener installer for solar table assembling of claim 8, wherein the fastener-loading interface comprises the fastener saddle, and the fastener saddle comprises:
front grooves to ensure correct positioning of the first or second fastener on the fastener saddle; and
one or more embedded magnets to retain the first or second fastener in place.

10. The automatic fastener installer for solar table assembling of claim 1, wherein each of the first and second fastener driving blocks comprises:
a slot for partial fastener insertion; or
an overhang for positioning above a tail of the first or second fastener to prevent the first or second fastener from tilting when the first or second fastener is pushed for installation.

11. A method of automatic fastener installation for solar table assembling, the method comprising:
given an automatic fastener installer comprising one or more installer branches operable by one or more lifters to be in a lifted position or a retracted position, each installer branch comprising an installer base frame, one or more actuators attached to the installer base frame, a top frame positioned above the installer base frame via one or more coupling brackets, a first fastener driving block mechanically driven by the one or more actuators to slide along the top frame, and a second fastener driving block mechanically driven by the one or more actuators to slide along the top frame, performing fastener installation operation comprising steps of:
loading a first fastener above the top frame next to the first fastener driving block and a second fastener above the top frame next to the second fastener driving block when the one or more actuators are in a retracted position;
operating the one or more installer branches to the lifted position to lift the installer base frame with the first and second fasteners aligned respectively to a slot on a first mounting bracket and a slot on a second mounting bracket, the first and second mounting brackets are attached to a torque tube, a solar module is placed on the torque tube with a first module frame aligned to the first mounting bracket and a second module frame aligned to the second mounting bracket; and
activating the one or more actuators to drive the first and second fastener driving blocks to push the first fastener into the slot in the first mounting bracket and the second fastener into the slot in the second mounting bracket to lock the first and second module frames.

12. The method of claim 11, wherein the steps further comprise:
operating the one or more installer branches and the one or more actuators to retract for a subsequent fastener installation cycle.

13. The method of claim 11, wherein the one or more actuators comprise a first actuator and a second actuator that are oriented in opposite directions.

14. The method of claim 13, wherein the first actuator and the second actuator are electric, pneumatic, or hydraulic actuators.

15. The method of claim 13, wherein the first fastener driving block is mechanically driven by the first actuator via a first fastener sled and the second fastener driving block is mechanically driven by the second actuator via a second fastener sled.

16. The method of claim 11, wherein the top frame has a first gap and a second gap to align respectively to the first mounting bracket and the second mounting bracket for fastener installation when the one or more installer branches are in the lifted position.

17. The method of claim 16, wherein the steps further comprise:

sensing, by a module rail sensor placed at each of the first and second gaps, a touch or proximity of the first or the second mounting bracket when the one or more installer branches are in the lifted position to enable fastener installation.

18. The method of claim 11, wherein each of the first fastener and the second fastener is loaded on a fastener-loading interface that receives and holds the first or second fastener, the fastener-loading interface is a spring-loaded fastener-loading interface or a fastener saddle placed on the top frame next to each of the first and second fastener driving blocks.

19. The method of claim 18, wherein the fastener-loading interface comprises the fastener saddle, and the fastener saddle comprises:

front grooves that match a tapered fastener head of the first or second fastener to ensure correct positioning of the first or second fastener on the fastener saddle; and one or more embedded magnets to retain the first or second fastener in place.

20. The method of claim 11, wherein each of the first and second fastener driving blocks comprises:

a slot that matches a tail profile of the first or second fastener for partial fastener insertion; or an overhang positioned above a tail of the first or second fastener to prevent the first or second fastener from tilting when the first or second fastener is pushed for installation.

\* \* \* \* \*